United States Patent [19]

Lien

[11] Patent Number: 5,149,433

[45] Date of Patent: Sep. 22, 1992

[54] METHOD AND APPARATUS FOR SUPPLY OF DECONTAMINATED FUEL TO DIESEL ENGINE

[75] Inventor: Larry A. Lien, Escondido, Calif.

[73] Assignee: Desalination Systems, Inc., Escondido, Calif.

[21] Appl. No.: 741,117

[22] Filed: Aug. 5, 1991

[51] Int. Cl.⁵ .................................................. B01D 35/14
[52] U.S. Cl. ...................................... 210/641; 210/90; 210/111; 210/171; 210/172; 210/195.2; 210/321.83; 210/416.4; 210/500.27; 210/651; 210/654; 210/741; 210/779; 210/805; 210/806
[58] Field of Search .............. 210/90, 100, 109, 111, 210/171, 172, 195.1, 195.2, 321.74, 321.83, 321.85, 335, 416.4, 433.1, 500.27, 637, 641, 651, 653, 654, 741, 779, 805, 806, DIG. 5

[56] References Cited

U.S. PATENT DOCUMENTS

| | | | |
|---|---|---|---|
| 3,119,437 | 1/1964 | Roosa | 210/90 |
| 3,410,411 | 11/1968 | Dence | 210/100 |
| 3,756,408 | 9/1973 | Spatz et al. | 210/96 |
| 4,072,610 | 2/1978 | Gow et al. | 210/90 |
| 4,534,865 | 8/1985 | Sundberg et al. | 210/692 |
| 4,548,714 | 10/1985 | Kirwan, Jr. et al. | 210/232 |
| 4,780,211 | 10/1988 | Lien | 210/DIG. 5 |
| 4,784,763 | 11/1988 | Hambleton et al. | 210/90 |
| 4,802,982 | 2/1989 | Lien | 210/321.83 |
| 4,814,087 | 3/1989 | Taylor | 210/500.27 |
| 4,902,417 | 2/1990 | Lien | 210/321 |
| 4,906,372 | 3/1990 | Hopkins | 210/321 |

FOREIGN PATENT DOCUMENTS

| | | | |
|---|---|---|---|
| 152719 | 11/1981 | Japan | 210/90 |
| 33994 | 8/1985 | Japan | 210/335 |

Primary Examiner—Robert A. Dawson
Assistant Examiner—Matthew O. Savage
Attorney, Agent, or Firm—Fitch, Even, Tabin & Flannery

[57] ABSTRACT

Apparatus for the supply of decontaminated fuel to a diesel engine including two filtering stages, the first being a spiral wound, cross flow ultrafiltration unit and the second being a spiral wound deadheaded ultrafiltration unit with a pressure operated alarm connected to respond to the build-up of contaminants in said second stage.

16 Claims, 2 Drawing Sheets

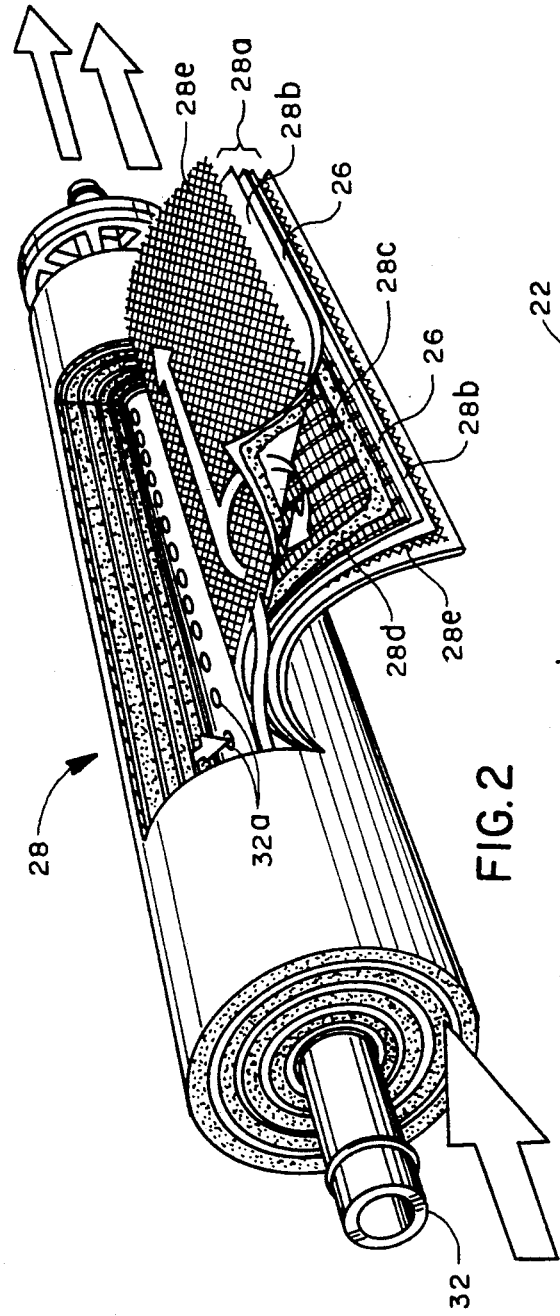
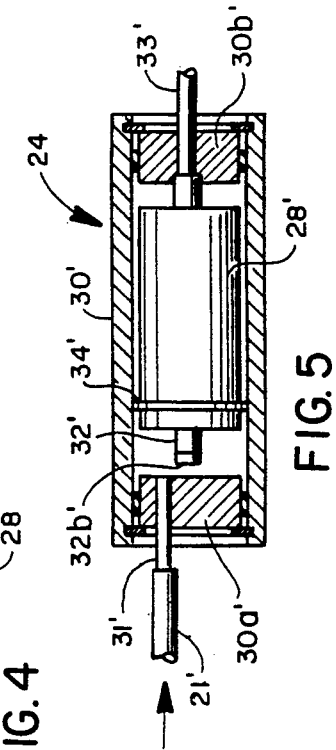
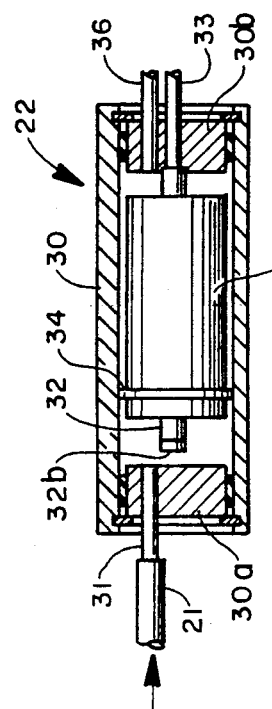
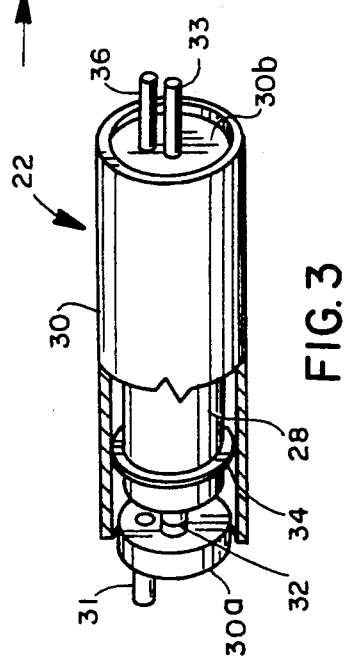

METHOD AND APPARATUS FOR SUPPLY OF DECONTAMINATED FUEL TO DIESEL ENGINE

BACKGROUND OF THE INVENTION

The present invention relates to method and apparatus for filtering contaminated hydrocarbon fuels for use in diesel engines.

The problems associated with the various types of contamination found in diesel fuel have been recognized for many years. The common types of fuel contamination encountered are (1) suspended solids (2) emulsified and entrained water and (3) anaerobic bacteria. These types of contaminants are particularly harmful in diesel engines because of the fuel injection systems used to spray the fuel into the engine cylinders to facilitate combustion. The fuel injectors associated with such systems have very fine openings which may be clogged and adversely affected by such impurities.

Water presents a particularly severe problem because it not only clogs injectors but also promotes the growth of anaerobic iron bacteria that digest fuel, releasing by-products of sulfur radicals, which attack ferrous fuel tank materials and add to the particulate contamination. These various types of contamination are likely to be introduced into the diesel fuel at any time during its storage, handling and shipping prior to its being used in an engine. Ballast water on ships is a major source of contamination of fuel. The major problem created from ballast water in connection with the fuel supply for diesel engines on ships involves the filling of empty fuel tanks with ballast water. This practice is common and results in the presence of significant amounts of water-contaminated fuel. Even though the ballast water is discharged before a ship is refueled, it is well known that significant amounts of water remain in the fuel tanks and that such water mixes with the fuel and is supplied to the ship's engines. Accordingly, to be effective in solving the problem of fuel contamination particularly in marine applications, any treatment of the fuel to overcome the problem should take place as close as possible to the time when the fuel is to be used.

As a consequence of and in recognition of the fact that diesel fuels may be expected to contain a significant level of contamination of the types noted above, it has been necessary to design the fuel injection systems for diesel engines so that the injectors will accept a certain level of contamination without becoming clogged or malfunctioning. This design approach results in the use of passages and orifices in the injectors which are larger than might be desired to provide the most favorable fuel spray for complete combustion of the fuel. Accordingly, if it were possible to assure contaminate-free fuel for use in a diesel engine, that engine could be designed with more efficient fuel injection than are currently in use on diesel engines.

It is known in the filter art to construct ultrafiltration systems using semipermeable membranes configured as spiral filters to provide increased membrane filter area in a very compact form. The United States Pat. No. 4,072,610 to Gow, et. al. is of interest with respect to the present invention in disclosing a filtering system utilizing spiral-wound membrane filters with a failure alarm associated with a particulate filter element. Of similar interest are the U.S. Pat. Nos. 4,784,763 to Hambleton, et. al. and 4,534,865 to Sundberg, et. al.

In the field of filtering, it is known that there are semipermeable membranes that are effective in selectively filtering small particles, water, bacteria and the like, and through selection of appropriate membrane materials and pore sizes in such membranes, it is known to purify liquids by filtering out contaminants However, in spite of there being known membranes that could be used in filtering such liquids as diesel fuel to remove these contaminants, there are no adequate systems for use with a diesel engine to purify the fuel and to assure that fuel 100% free of the various contaminants described above is continuously supplied. Prior art filtering systems that have alarm systems responsive to a breakthrough in the filter membranes have no backup means to guarantee that shutdown of the system will occur prior to some of the impurities being allowed to pass through the system and cause malfunctioning in the device for which the filtrate is to be supplied. If the device is a diesel engine, the passage of limited amounts of impurities to the engine may result in serious malfunctioning problems in connection with the fuel injectors. Accordingly, it is important that the system be such that during the period of breakthrough until the supply system is interrupted there should be means to prevent delivery of impurities and contaminants to the engine.

SUMMARY OF THE INVENTION

The present invention involves a fuel filtering system or method in combination with a diesel engine. A series of two spiral wound ultrafiltration filters are used to process diesel fuel circulating from a fuel tank to the fuel injector line of the diesel engine. Each of the filters has a membrane which blocks passage of the solid particles, water and bacteria contaminants while passing through the uncontaminated fuel. The first of the two filters operates as a cross flow filter with the bypassed flow being returned to the fuel tank, and the second filter is connected so that all the flow passes through the filter membrane. Means responsive to pressure across the second filter functions to disable fuel flow to the engine in the event of a pressure increase indicating breakdown of the first filter. The excess fuel circulated to the fuel injector line is recirculated back to the fuel tank.

The use of the two semipermeable membrane separation devices guarantees against any contaminants being passed through the system to the fuel injectors in the event of a breakthrough on the first of the two separation devices or units. The second filtration unit has the same spiral membrane as the first and is, therefore, a backup to block any contaminants that may be passed through the first filter in the event of a breakthrough on the first filter. The second filtration unit is only intended to be operative when such a breakthrough occurs in the first filtration unit, and since the first filtration unit removes all the above described contaminants, there will be no build-up of contaminants on the second filtration unit unless such a breakthrough occurs.

The second filter is also used as a part of the failure alarm by having the change in pressure across the second filter trigger the alarm and the interruption of fuel flow to the engine. In the event of a breakthrough in the first filtration unit, there will be a period of time required for contaminants passing through the first filter to build up on the second membrane to a sufficient extent to actuate the alarm and control responsive to the pressure change across the second filter. Since the second filter is designed to have the same capacity to remove contaminants as the first filter, there is no risk of contaminants being passed through to the engine and its fuel injectors before interruption of fuel flow has been accomplished by the controls. Thus, there is provided a method and apparatus for a diesel engine that assures the supply of contaminant-free fuel to the engine.

Accordingly, it is an object of the present invention to provide improved method and apparatus for supplying contaminant-free diesel fuel to an engine, and particularly to marine engines.

It is another object of the present invention to provide improved method and apparatus for filtering a hydrocarbon fuel using two semipermeable membrane devices connected in series, with the first in a cross flow configuration and the second in a deadheaded configuration with a failure alarm responsive to changes in pressure across the second membrane.

It is a further object of the present invention to provide improved method and apparatus for filtering all contaminants from fuel being supplied to a diesel engine with alarm and control means to interrupt such supply in the event of failure of the filtering process.

These and other objects of the invention should be apparent from the following detailed description for carrying out the invention when read in conjunction with the accompanying drawings.

BRIEF DESCRIPTION OF THE DRAWINGS

FIG. 2 is a perspective view of a spiral-wound ultrafiltration element used in the apparatus of FIG. 1 with a portion cut away to illustrate the interior construction;

FIG. 3 is a perspective view of an assembly of a spiral-wound cross flow ultrafiltration element in a module used in the apparatus of FIG. 1;

FIG. 4 is a sectional view of the filter module of FIG. 3; and

FIG. 5 is a sectional view of a spiral-wound, deadheaded ultrafiltration unit used in the apparatus of FIG. 1.

DETAILED DESCRIPTION OF THE PREFERRED EMBODIMENT

Figure 1:
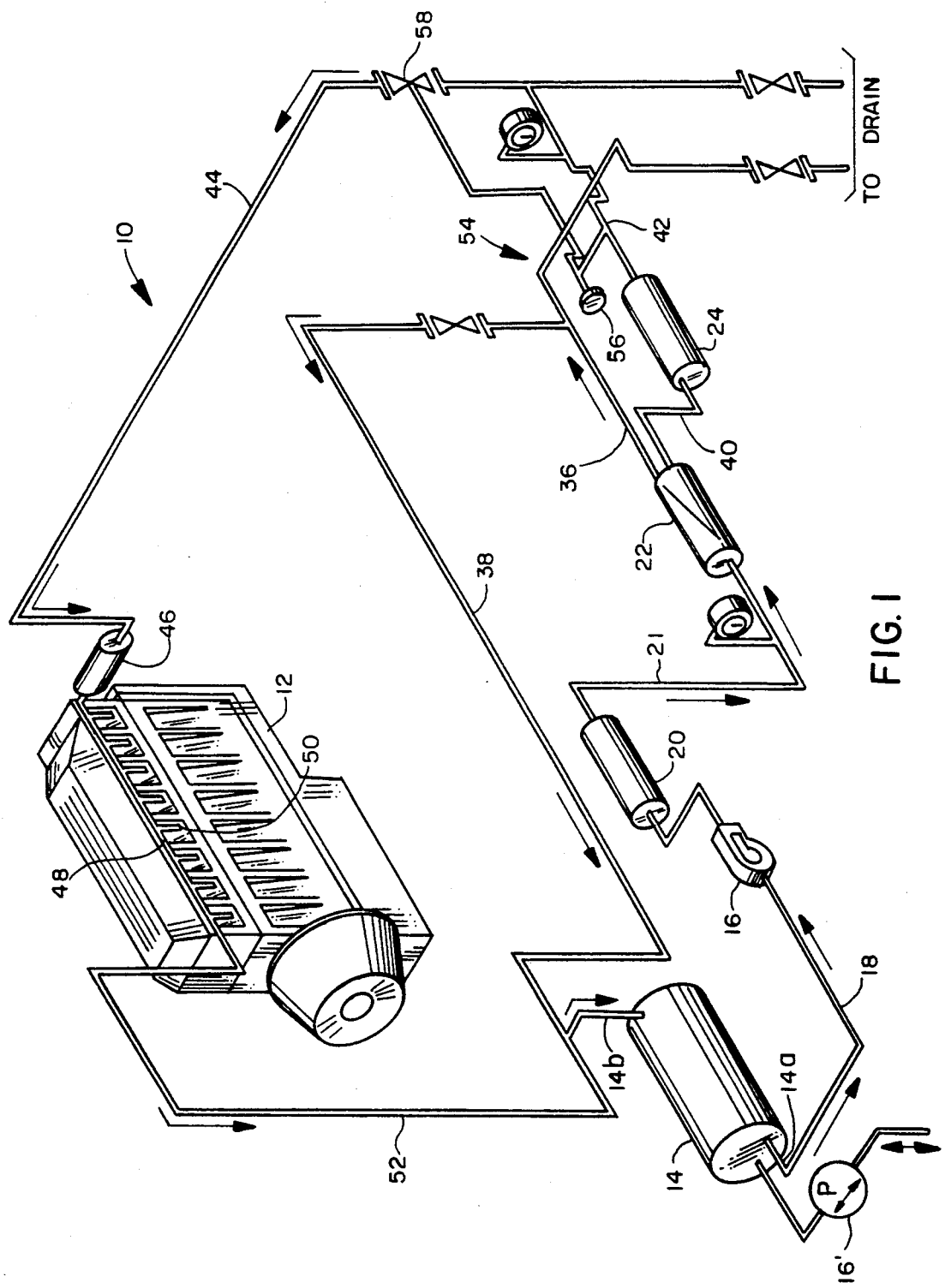
FIG. 1 is a schematic diagram of a diesel engine fuel supply apparatus embodying the present invention.

Referring to FIG. 1 of the drawings, there is shown a schematic diagram of the apparatus for supplying decontaminated fuel to diesel engines, the apparatus being designated generally by reference numeral 10. It is contemplated that the apparatus 10 would be integrated with and made part of a diesel engine 12 with which it is associated. Diesel engines are commonly used in industrial and commercial applications in preference to gasoline engines because of their lower operating costs and higher efficiency. The diesel engine burns fuel obtained from distillation of petroleum and is composed chiefly of unbranched paraffins. Because the diesel engine is a compression ignition engine, it requires that the fuel be sprayed into the cylinder heads under pressure by fuel injectors which have small orifices to produce a fine fuel spray. The satisfactory operation of a diesel engine is significantly affected by the proper functioning of the fuel injectors. The various contaminants often present in diesel fuel have made the problem of clogged or malfunctioning injectors a serious concern in the operation of the diesel engine, and particularly marine engines.

Diesel fuels in storage and during transportation, or transfer from transportation facilities to storage facilities, tend to become contaminated with solid particles, water and bacteria. This is a particular problem in marine engines where diesel fuel tanks, when empty, may be filled with ballast water. Even though the marine fuel tanks are pumped out to remove the ballast water, it is well known that some residue of ballast water will invariably remain to be mixed in with the fuel when the tanks are refueled. All of these contaminants tend to present problems in clogging the fuel injectors of diesel engines. The current technology with respect to the treatment of diesel fuel involves the use of various types of filters in the fuel supply systems for such diesel engines. The conventional methods of fuel filtering include either metal edge or composition cartridge filters. A metal edge filter utilizes metal discs with small spaces between the discs whereby foreign matter is held at the inlet edges of these discs. Composition filters consist of a cartridge packed with fibers such as cotton, wool and impregnated paper, cellulose discs, fuller's earth, etc. Particles are filtered by either metal mesh or any of the fibrous material that has hydrophilic properties, such as cotton, wool or paper, etc. Filters are reasonably effective until the particle load blocks fuel through put or until the fibers become saturated with water. Excessive water is passed through with no barrier to prevent intake into the fuel pump and injectors. In marine applications where excessive water is present, several of these filters are often connected in series.

Most of these currently used fuel filtering systems permit minute quantities of water and particles to enter the fuel pump and injectors, thereby causing possible problems with injector clogging and malfunctioning. The present invention involves the use of semipermeable membranes which assure complete decontamination of the diesel fuel to completely eliminate the problems caused by such injector clogging and malfunctioning.

For the purpose of supplying fuel to the engine 12, there is provided a fuel tank 14 which has a fuel outlet 14a, and a fuel inlet and return 14b. The fuel tank can serve as a ballast tank to be filled with water when fuel is exhausted therefrom. A pump 16' is connected to the tank to supply ballast water to, and to remove ballast water from the fuel tank. The fuel outlet 14a is connected to a low-pressure pump 16 by means of a fuel line 18. The pump is necessary to provide a pressure to force the fuel through the semipermeable membranes to be described below. The output of the pump 16 passes through a prefilter 20 which is a particle filter intended to remove large particles (30 microns) from the diesel fuel and protect the semipermeable membranes located downstream. Connected to the output of the prefilter 20 through a fuel line 21 is a first ultrafiltration unit 22 which is in series with a second ultrafiltration unit 24. The first ultrafiltration unit 22 is a spiral-wound filter having an semipermeable membrane 26 which in the preferred embodiment is a polytetrafluoroethylene PTFE membrane having a pore size of 0.02 micrometers. The membrane 26, as shown in FIG. 2, with the 0.02 micron pore size is efficient in passing the diesel fuel and blocking passage of all free and entrained water and particles in size down to 0.02 microns. The bacteria normally found in diesel fuel is generally larger than 0.2 microns and therefore, is blocked by the membrane 26.

The first filter unit 22 is arranged in a cross flow configuration with the fuel to be filtered, sweeping by the upstream face of the spiral membrane 26 and the filtered or contamination-free fuel passing through the membrane.

As shown in FIGS. 2-4, the first ultrafiltration unit 22 includes a spiral wound element 28 which is mounted in a housing 30. The element 28 includes a spirally-arranged laminate or sandwich 28a in the form of a flat envelope which includes two outer sheets of the membrane 26, a liquid permeable backing layer 28b (adjacent each sheet, a spacer layer 28c and a sealing edge 28d. This laminate 28a is spirally wound around an axially extending porous pipe 32 which is plugged at 32b at its upstream end. Wrapped between the spirally-wound layers of the laminate 28a is a feed channel spacer 28e. The wrapped element 28 with its axially extending collection pipe 32 is removably mounted in housing 30 with a sealing gasket 34 positioned between the outside diameter of element 28 and the inside of the housing 30, as shown in FIGS. 3 and 4. The details of the spiral wound element 28 are described in my U.S. Pat. No. 4,802,982, which is included herein by reference. Removable end plates or walls 30a and 30b seal the ends of the housing 30 in which element 28 is received. The feed solution or diesel fuel enters the upstream end of the housing 30 through a fuel inlet pipe 31. The diesel fuel then enters the upstream end of the spiral wound element 28 and flows through the feed channel spacer 28e between the layers of the spiral laminate 28a, the feed channel extending from one end of the element 28 to the other. The filtered diesel fuel passes through the membrane 26 into the laminate spiral 28a and moves to the center of the spiral where it enters the axially extending pipe 32 through openings 32a. The filtered output from the element 28 flows toward the right as shown in FIG. 4, passing through outlet 33. The by-passed fuel which has not passed through the membrane 26 exits the filter unit 22 through a conduit 36 which connects to a fuel return line 38 connected to the fuel tank return 14b, as shown in FIG. 1. Thus, the fuel delivered by the pump 16 through the prefilter 20 to the first ultrafiltration unit 22 is either passed through the filter membrane 26 or is returned to the fuel tank 14.

The filtered and decontaminated diesel fuel from the first ultrafiltration unit 22 is delivered through outlet 33 to a conduit 40 to the second ultrafiltration unit 24. The second ultrafiltration unit 24 is substantially identical to the ultrafiltration unit 22, having a spiral-wound element 28' with a PTFE membrane but is not arranged in a bypass flow configuration but is arranged in a so-called deadheaded configuration. Thus, the unit 24 is blocked so that no diesel fuel may flow through a by-pass flow outlet and all of the flow into the second ultrafiltration unit 24 can only exit through the central pipe 33' after passing through the semipermeable membrane therein. As shown in FIG. 5, the ultrafiltration unit 24 includes a housing 30' with removable end walls 30a' and 30b' and a sealing gasket 34'. The only difference between the units 22 and 24 is the absence of any bypass outlet 36 in the end wall 30b'. There is only one outlet 33' which connects to the pipe 32' to receive the filtered fuel which has passed through the membrane 26' in the element 28'.

Accordingly, the output of the ultrafiltration unit 24 has passed through the semipermeable membrane 26 in the first ultrafiltration unit 22 and also the corresponding membrane 26' in the second ultrafiltration unit 24. It is then circulated through a conduit 42 which connects to a pump supply line 44 to a fuel injector pump 46. The fuel injector pump 46 supplies fuel to a fuel injector line 48 to which fuel injectors 50 are connected. The downstream end of the fuel injector supply line 48 is connected by a fuel line 52 to the fuel tank return 14b.

During the normal operation of the first ultrafiltration unit 24, the contaminants in the fuel will all be removed from the fuel delivered through conduit 40 to the second ultrafiltration unit 24 and there will be no build-up of contaminants on the membrane of element 28' until a breakthrough occurs on the first ultrafiltration unit 22.

In order to protect the apparatus 10 against the breakdown in the operation of the first ultrafiltration unit 22, there is provided a failure alarm 54 which includes differential pressure responsive control 56 and a valve 58. In the event of a breakthrough in the first ultrafiltration unit 22, contaminants may pass through the membrane 26 or a breach therein, passing through the conduit 40 from the unit 22 into the second ultrafiltration unit 24. At that point, the contaminants in the system will begin to clog the pores in the membrane of the unit 24, thereby increasing the differential pressure across the membrane sensed by the control 56. The control 56 is provided with sufficient sensitivity so that the change created by the deposit of contaminants on the membrane of the second ultrafiltration unit 24 will cause an alarm signal to be generated and the fuel flow to the engine 12 will be interrupted by closing the valve 58 located in the injector pump supply line 44. It may be understood that as an alternative construction, the control 56 could be connected and calibrated to respond to the pressure upstream of the second ultrafiltration unit 24 which would also increase upon certain failures of the first ultrafiltration unit 22 and/or to the downstream pressure which would decrease upon the buildup of contaminants on the membrane of the second ultrafiltration unit 24.

It should be understood that the second ultrafiltration unit 24 performs two separate and distinct functions in the system 10. First, it functions along with the differential pressure control 56 to signal the breakthrough or malfunctioning of the first ultrafiltration unit 22, as a consequence of the change in pressure as the contaminants build up on the membrane on the second ultrafiltration unit 24. In addition, the second ultrafiltration unit 24 provides the backup protection for the engine 12 and the fuel injectors 50 during the period of time between when the first ultrafiltration unit 22 malfunctions and releases contaminants until the system is shut down through the action of the failure alarm system 54. Since the membrane contained in each of the first and second ultrafiltration units 22 and 24 respectively, are identical with both being made of PTFE with the same 0.02 micron pore size, the second membrane provides absolute protection for the engine 12 and the injectors 48. As a consequence of the membrane in the second ultrafiltration unit 24 not having to serve as a primary filtration medium for any extended period of time, it may be feasibly connected in a deadheaded configuration rather than in a cross flow configuration of the unit 22. Being in the deadheaded configuration, the filter unit 24 may then serve to provide the change in differential pressure, indicating a breakdown in the first ultrafiltration unit 22.

It is further noted that the cross flow configuration of the first filter unit 22 continues to provide a bypass for a portion of the fuel pumped by the pump 16, even after a breakthrough of the membrane 26 in the first filter unit. This bypass flow provides pressure relief for the deadheaded semipermeable membrane of the second filter unit 24.

The combined diesel engine and decontamination apparatus 10 described above provides the first practical solution to the problems presented by use of contaminated fuel in diesel engines. By associating the filtering system directly with the engine itself, the risks of further contamination between the time of purification and use is eliminated. The combination of the two membrane filters, one being a backup for the other, is made practical by having the first filter being in a cross flow configuration with the bypassed fuel providing a sweeping action carrying the contaminants from the membrane back to the fuel tank. Further, the second ultrafiltration unit functions not only as a backup filter in the event of a breakthrough on the first semipermeable membrane, but also serves as a part of the failure alarm. By having the second filter unit function as a completely effective backup filter, the short unavoidable delay in the response of the failure alarm presents no risks to the diesel engine and its fuel injectors.

Extensive testing of the various elements of the apparatus 10 has verified the effectiveness of the method and apparatus of the present invention. Such testing involved the use of membrane elements 26 each having surface areas of 13 square feet and with fuel flow rates of 15 to 17 gallons per hour with a supply pressure on the first stage of the filter system of 40 psi. The tests included processing fuel contaminated with various levels of up to 10,000 ppm solids and water. In addition, tests were run with bacteria contamination using Pseudomonas Aleruginosa which were cultured and added to clean fuel to provide $10^7$ colonies of bacteria in the fuel.

The various tests were run for 12 hours and measurements made as to the decrease in fuel flow through the system and the effectiveness of the system in removing the contaminants. In the tests with solids and water contamination, flow decreased on the order of 15% with the first stage filter effecting complete removal of the contaminants. Similarly, the test with the bacteria contamination showed a fuel flow decrease of on the order of 10% and with complete removal of the bacteria contamination in the first stage filter.

The spiral-wound membrane filters are commercially available and are designed to be disassembled and unwound for cleaning purposes. The preferred embodiment of the member is a hydrophobic polytetrafluoroethylene which is easily washed with water to remove the contaminants which have accumulated on the membrane. Thus, depending on the levels of impurities or contaminants in the fuel being treated, a schedule of filter cleaning may be established to assure a continued adequate fuel flow rate. If the application required continuous operation, parallel filters could be provided so that alternative filtering facilities could be utilized while one set was shut down for cleaning.

While the membrane material used in the tested embodiment was hydrophobic polytetrafluoroethylene, there are other known filter membrane materials which may be suitable for the semipermeable membranes of the first and second stage filters 22 and 24. Oleophilic materials are useful for such filter membranes. As indicated above, the membranes of the described embodiment had a pore size of 0.02 microns which functioned well in the tests described above. Depending on the types of contaminants present in the diesel fuel being purified, it is contemplated that the pore size could vary from 0.0002 to 2 microns as long as the filter membrane is capable of blocking passage of the contaminants present in the fuel.

There are several secondary benefits accruing from the method and apparatus which eliminates substantially all contaminants. The uncontaminated fuel will burn better, producing less air pollution and better engine efficiency. In addition, significant design restrictions will be eliminated as far as the configuration of the fuel injectors are concerned. The freedom to use smaller orifices in the fuel nozzles should result in better vaporization of the fuel prior to combustion and more complete combustion. This improvement in injector nozzle design is feasible only if the fuel supplied to the engine is free of contaminants that would otherwise clog these smaller orifices.

The use of the method and apparatus of the present invention in connection with marine applications is particularly important in view of the frequent presence of water contamination in marine diesel fuel supplies. The use of empty fuel tanks on ships as containers for water ballast is the major factor contributing to such fuel contamination. Through use of the present invention, the malfunctioning problems associated with the use of such contaminated fuel are completely eliminated. By integrating the apparatus with the marine diesel engine, there is no risk that the fuel will be further contaminated after being filtered. The continuing use of the two separate filtration stages with the second stage having the semipermeable membrane connected in the deadheaded mode guarantees against water contaminants reaching the fuel injectors before shutdown occurs. The spiral filters employed in the method and apparatus of the present invention are easily cleaned, making it economically feasible to use them on a continuing basis to reduce diesel engine maintenance to a minimum and to permit greater flexibility in the design of more efficient fuel injectors for such diesel engines.

Although the invention has been described with regard to a preferred embodiment, it should be understood that various changes and modifications as would be obvious to one having the ordinary skill in this art may be made without departing from the scope of the invention which is defined in the appended claims.

What is claimed is:

1. A diesel engine in combination with fuel decontamination apparatus comprising:
   a diesel engine including fuel injectors and a fuel injector pump means, said fuel injector pump means being connected to supply fuel to said fuel injectors;
   a fuel tank having a fuel supply outlet and a fuel return inlet;
   decontamination apparatus including a first ultrafiltration unit connected to receive contaminated fuel from said fuel supply outlet and having a filter membrane which passes diesel fuel and blocks passage of impurities, namely, suspended solids, water and bacteria;
   bypass conduit means for delivering diesel fuel and said impurities blocked by said membrane from said first ultrafiltration unit to said fuel return inlet in said fuel tank;
   a second ultrafiltration unit connected by conduit means to said first ultrafiltration unit to receive decontaminated diesel fuel from said first ultrafiltration unit;

said second ultrafiltration unit having a filter membrane which passes diesel fuel and blocks passage of impurities, namely, suspended solids, water and bacteria;

means supplying decontaminated diesel fuel from said second ultrafiltration unit to said fuel injector pump; and differential pressure control means responsive to change in pressure across said second ultrafiltration unit to provide an alarm signal indicating a failure in said first ultrafiltration unit.

2. A diesel engine in combination with fuel decontamination apparatus as recited in claim 1 including a fuel pump connected between said fuel tank and said first ultrafiltration unit;

said differential pressure control means including a first pressure sensing means responsive to the pressure of the fuel between said first ultrafiltration unit and said second ultrafiltration unit and a second pressure sensing means responsive to the pressure of the fuel between said second ultrafiltration unit and said fuel injector pump.

3. A diesel engine in combination with fuel decontamination apparatus as recited in claim 2, wherein said first ultrafiltration unit is a cross flow filter and said second ultrafiltration unit is a deadheaded filter.

4. A diesel engine in combination with fuel decontamination apparatus as recited in claim 3, wherein said membranes in said first and second ultrafiltration units are formed of polytetrafluoroethylene.

5. A diesel engine in combination with fuel decontamination apparatus as recited in claim 3, including a particulate filter connected to filter fuel between said fuel pump and said first ultrafiltration unit.

6. The fuel tank can serve as a ballast tank to be filled with water when fuel is exhausted therefrom. A pump 16' is connected to the tank to supply ballast water to, and to remove ballast water from the fuel tank.

7. A diesel engine in combination with fuel decontamination apparatus as recited in claim 1, wherein said membranes in said first and second ultrafiltration units are formed of oleophilic material.

8. A diesel engine in combination with fuel decontamination apparatus as recited in claim 7, wherein said membranes have a pore size of between 2 and 20,000 Angstroms.

9. A diesel engine in combination with fuel decontamination apparatus as recited in claim 1, wherein said differential pressure control means is connected to a valve to interrupt the supplying of diesel fuel to said fuel injector pump on failure of said first ultrafiltration unit.

10. A fuel system for a marine diesel engine for providing decontaminated diesel fuel from a fuel supply contaminated with water, suspended solids and bacteria comprising:

a fuel injector supply line to supply diesel fuel to a plurality of fuel injectors;

a fuel injector pump connected to supply fuel under pressure to said fuel injector supply line;

a fuel tank having a fuel outlet and a fuel return inlet, said return inlet being connected to receive fuel from said fuel injector supply line;

a first stage filter and a second stage filter connected in series to filter fuel passing from said fuel tank outlet to said fuel injector pump;

said first stage filter including a pressurized cross flow, spiral-wound ultrafiltration element having a membrane with a pore size sufficiently small to block passage of all suspended and colloidal solids, water and bacterial contamination while passing decontaminated fuel through;

said first stage filter having a concentrate outlet to bypass contaminated fuel;

a concentrate return line connecting said concentrate outlet to said fuel return inlet;

said second stage filter including a pressurized spiral-wound ultrafiltration element having a membrane with a pore size corresponding to the membrane in said first stage filter;

said ultrafiltration element in said second stage filter operating in a deadhead mode wherein all of the fuel entering said second stage filter passes through its spiral-wound ultrafiltration element; and control means responsive to changes in the differential pressure across said second stage filter to interrupt the supply of fuel to said fuel injector supply line.

11. A fuel system for a marine diesel engine as recited in claim 10, wherein said membranes in said first and second stage filters are formed of polytetrafluoroethylene and are formed with a pore size of on the order of 0.02 $\mu$.

12. A fuel system for a marine diesel engine as recited in claim 11, including a second pump connected in the fuel line between said fuel tank outlet and said first stage filter to increase the pressure of the fuel delivered to said first stage filter and a particulate filter in the fuel line between said second pump and said first stage filter.

13. A fuel system for a marine diesel engine as recited in claim 12 wherein said fuel tank serves as a ballast tank to be filled with water when fuel is exhausted therefrom, and pump means connected to supply ballast water to and to remove ballast water from said fuel tank.

14. A method of decontaminating diesel fuel which is contaminated with suspended and colloidal solids, water and bacteria to prepare such fuel for use in a diesel engine comprising the steps of:

pumping contaminated diesel fuel from a tank into a first filtering stage in which the contaminated diesel fuel is circulated across a spiral-wound ultrafiltration element having a membrane with a pore size sufficiently small to block passage of all contaminants which include water, suspended solids and bacteria;

passing a portion of the diesel fuel through said membrane to provide fuel free of said contaminants;

circulating said portion of said diesel fuel into a second filtering stage in which all of said portion is passed through a spiral-wound ultrafiltration element having a membrane with a pore size sufficiently small to block passage of all such contaminants;

circulating from said first stage filter the other portion of said contaminated diesel fuel that bypasses said membrane and returning said other portion to said tank;

pumping said portion of said diesel fuel from said second filtering stage into a fuel injector feed line for a diesel engine;

recirculating said diesel fuel from said fuel injector feed line to said tank, and measuring the pressure differential of the circulating diesel fuel across said second filtering stage.

15. A method of decontaminating diesel fuel, as recited in claim 14, including the step of interrupting the pumping of said diesel fuel to said fuel injector feed line upon a predetermined change in said measured pressure differential.

16. A method of decontaminating diesel fuel, as recited in claim 15, including the step of prefiltering said contaminated diesel fuel prior to its being circulated to said first filtering stage.

* * * * *

UNITED STATES PATENT AND TRADEMARK OFFICE
CERTIFICATE OF CORRECTION

PATENT NO. : 5,149,433
DATED : September 22, 1992
INVENTOR(S) : Larry A. Lien

It is certified that error appears in the above-indentified patent and that said Letters Patent is hereby corrected as shown below:

Column 2, line 4, after "contaminants" insert a period (--.--). Column 5, line 8, change "(adjacent" to --adjacent--.
IN THE CLAIMS: Column 9, lines 35-38, delete Claim 6 and insert in its place --6. A diesel engine in combination with fuel decontamination apparatus as recited in Claim 3, including an injector fuel supply line connected to said fuel injector pump means and said fuel injectors, a return fuel conduit connecting said injector fuel supply line to said fuel tank fuel return inlet.--

Signed and Sealed this

Fifth Day of October, 1993

Attest:

BRUCE LEHMAN

*Attesting Officer*    *Commissioner of Patents and Trademarks*